United States Patent
Alkan et al.

(10) Patent No.: US 11,080,775 B2
(45) Date of Patent: Aug. 3, 2021

(54) RECOMMENDING MEALS FOR A SELECTED GROUP

(71) Applicant: INTERNATIONAL BUSINESS MACHINES CORPORATION, Armonk, NY (US)

(72) Inventors: Oznur Alkan, Clonsilla (IE); Adi I. Botea, Dublin (IE); Akihiro Kishimoto, Castleknock (IE); Radu Marinescu, Castleknock (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 744 days.

(21) Appl. No.: 15/693,765

(22) Filed: Sep. 1, 2017

(65) Prior Publication Data

US 2019/0073601 A1    Mar. 7, 2019

(51) Int. Cl.
| | |
|---|---|
| G06Q 30/06 | (2012.01) |
| G06N 20/00 | (2019.01) |
| G06N 5/04 | (2006.01) |
| G06Q 50/12 | (2012.01) |
| G06N 5/02 | (2006.01) |

(52) U.S. Cl.
CPC ......... *G06Q 30/0631* (2013.01); *G06N 20/00* (2019.01); *G06N 5/02* (2013.01); *G06N 5/047* (2013.01); *G06Q 50/12* (2013.01)

(58) Field of Classification Search
CPC .... G06Q 30/0631; G06Q 30/00; G06Q 50/12; G06N 20/00; G06N 20/10; G06N 20/20; G06N 5/047; G06N 5/003; G06N 5/02; G06N 5/025; G06N 3/006; G06N 3/088; G06N 7/005; G09B 19/00; G09B 5/00; G06F 19/3475

See application file for complete search history.

(56) References Cited

U.S. PATENT DOCUMENTS

| | | | |
|---|---|---|---|
| 8,706,525 B2 | 4/2014 | Schwarzberg et al. | |
| 8,918,355 B2 | 12/2014 | Perrier et al. | |
| 10,679,200 B1 * | 6/2020 | Wolter | ............... G06Q 30/0201 |
| 2010/0003647 A1 | 1/2010 | Brown et al. | |
| 2013/0216982 A1 * | 8/2013 | Bennett | ................ A61B 5/4866 |
| | | | 434/127 |
| 2013/0224694 A1 | 8/2013 | Moore et al. | |
| 2014/0127651 A1 * | 5/2014 | Brazell | ............... G06F 19/3475 |
| | | | 434/127 |
| 2014/0365313 A1 * | 12/2014 | Reese | ................ G06Q 30/0269 |
| | | | 705/14.66 |
| 2015/0025997 A1 * | 1/2015 | Tilenius | ............ G06F 16/24578 |
| | | | 705/26.7 |
| 2015/0294593 A1 | 10/2015 | Schoen et al. | |

(Continued)

FOREIGN PATENT DOCUMENTS

CN    106548006 A  *  3/2017  ............. G06F 19/00

*Primary Examiner* — Yogesh C Garg
(74) *Attorney, Agent, or Firm* — Griffiths & Seaton PLLC

(57) ABSTRACT

Embodiments for recommending meals by a processor. A collaboration of data capturing a plurality of factors of a group user profile for each user in a group of users may be received for aiding in recommending one or more meals. The one or more meals may be recommended for the group of users according to the group user profile such that the recommending balances a satisfaction level for the one or more meals for the group of users.

20 Claims, 7 Drawing Sheets

(56) References Cited

U.S. PATENT DOCUMENTS

| | | | |
|---|---|---|---|
| 2016/0140644 A1* | 5/2016 | Babu | G06Q 30/0631 |
| | | | 705/26.7 |
| 2016/0171514 A1 | 6/2016 | Frank et al. | |
| 2017/0139385 A1* | 5/2017 | Young | G09B 19/0092 |
| 2017/0220772 A1* | 8/2017 | Vleugels | A61B 5/4875 |
| 2018/0075551 A1* | 3/2018 | Dayama | G06Q 30/0631 |

* cited by examiner

RECOMMENDING MEALS FOR A SELECTED GROUP

BACKGROUND OF THE INVENTION

Field of the Invention

The present invention relates in general to computing systems, and more particularly to, various embodiments for cognitively recommending meals for a group of members over a selected time period to maximize a level of satisfaction of all group members by a processor.

Description of the Related Art

In today's society, food consumption and dining experiences play a major factor in overall quality of life such as, for example, to increase and develop positive, social relationships. Factoring into the overall quality of life is the ability to access a variety of food choices and food sources (e.g., restaurants, grocery stores, and the like). In addition, more and more people are being made aware of the importance of leading a healthy and wholesome lifestyle. For some, eating a well-balanced and nutritional meal assists in maintaining a healthy lifestyle while helping to prevent obesity, disease, or other physical restrictions or limitations. Also, the variety of food choices and food sources assist in providing both personal satisfaction and nutritional requirements along with building, maintaining, and providing positive, social relationships such as, for example, family reunions, business meetings, and special events and occasions.

Furthermore, many consumers use various computing systems in a variety of settings that relate to ordering, purchasing, or searching for food or food sources. Current network and communication technologies, such as machine-to-machine (M2M) technologies and the Internet, allow devices to communicate more directly with each other using wired and wireless communication systems. For example, the Internet provides for a system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet). In other words, the IoT can refer to uniquely identifiable devices and their virtual representations in an Internet-like structure.

SUMMARY OF THE INVENTION

Various embodiments for recommending meals for a group of members to maximize consumption satisfaction of each member of a group using one or more Internet of Things (IoT) devices in an IoT network by a processor, are provided. In one embodiment, by way of example only, a method for recommending meals by a processor is provided using a plurality of types of Internet of Things (IoT) devices in an IoT network. A collaboration of data capturing a plurality of factors of a group user profile for each user in a group of users may be received for aiding in recommending one or more meals. The one or more meals may be recommended for the group of users according to the group user profile such that the recommending balances a satisfaction level for the one or more meals for the group of users.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
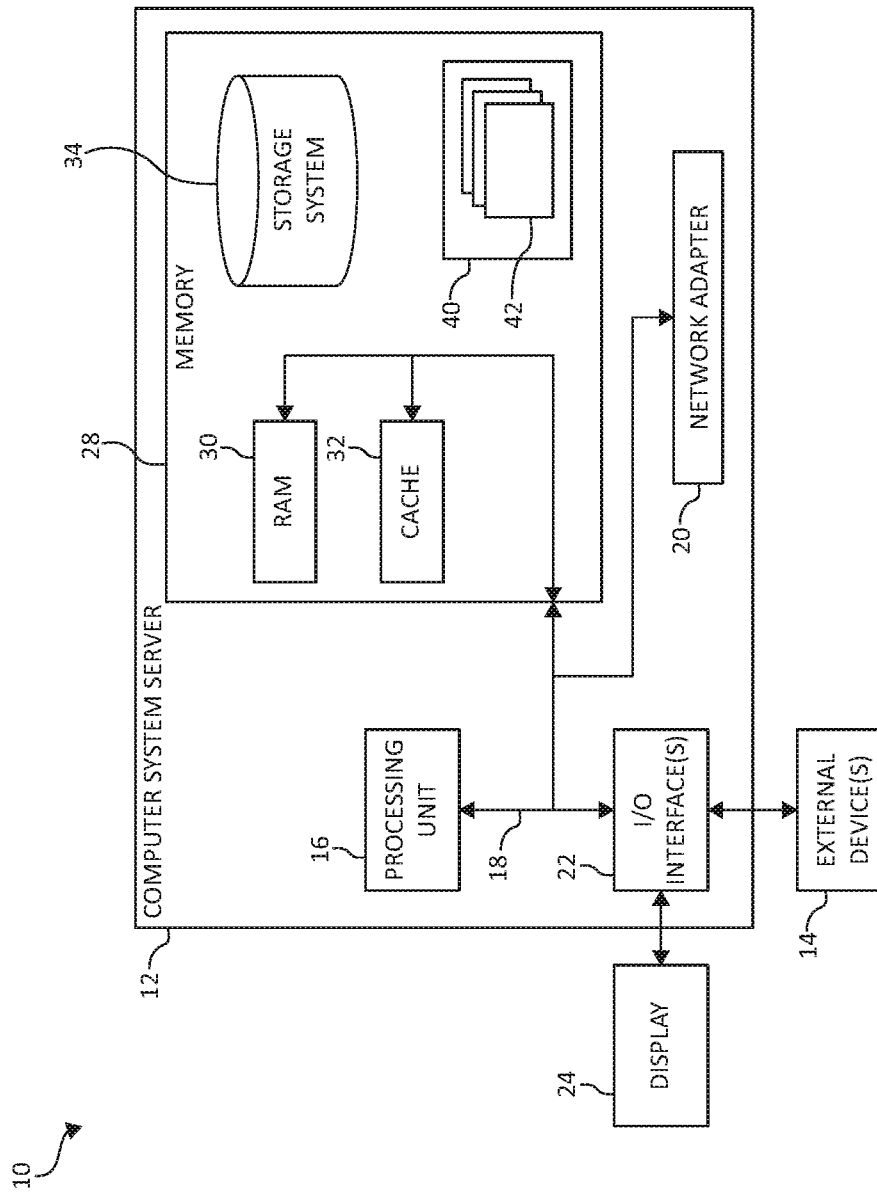
FIG. 1 is a block diagram depicting an exemplary computing node according to an embodiment of the present invention.

In the course of their daily lives, people engage in a variety of behaviors that may have a positive or negative impact on their health, wellbeing, social life, and on the people with whom they live, spend time, or otherwise interact. One impact that affects the overall quality of life is the ability to access a variety of food choices and food sources (e.g., restaurants, grocery stores, and the like). In addition, many people, businesses, and organizations promote a healthy diet and exercise habits for maintaining a healthy lifestyle. However, many times, regardless of the health benefits or taste, a person may or may not desire to eat the same, repeated foods over and over preferring alternative food choices, flavors, and choices. Such reasons may include nutritional constraints, eating preferences, habits, and degrees of eating satisfaction. For example, a fitness trainer may continuously eat the same meal that is high in protein, low in fat, and moderate in carbohydrates such as, for example, chicken, rice, and broccoli. Alternatively, another person may enjoy all sorts and varieties of foods, each of which may have both healthy and unhealthy nutritional content. Still, some persons may have eating restrictions such as, for example, allergies. In any event, many times each of these persons may find themselves eating alone or together with other persons having completely different food preferences, constraints, and degrees of satisfaction. To this end, cooking activities are ubiquitous in a variety of environments, industries, businesses, and organizations such as, for example, families, hospitals, elementary schools, canteens, restaurants, hotels, all-inclusive packages, and the like.

Thus, a need exists for creating food and meal recommendations for balancing food preferences, constraints, and degrees of satisfaction amongst a group of persons. In one aspect, various embodiments provide a solution for recommending meals using a plurality of types of Internet of Things (IoT) devices in an IoT network. A collaboration of data capturing a plurality of factors of a group user profile for each user in a group of users may be received for aiding in recommending one or more meals. The one or more meals may be recommended for the group of users according to the group user profile such that the recommending balances a satisfaction level for the one or more meals for the group of users.

In an additional aspect, the present invention provides for recommending a single meal course or multi-course meal for a group of people over a selected time period. A history of previous meals for each of the group members, food preferences for individual members, dietary and health constraints for individual members, and a list of possible dishes/entrees provided by a food source may be received. A history of the degree of satisfaction (or satisfaction level) of each group member may be received with respect to each of the previous meals in the history. A recommendation of at least one single meal course or multi-course meals may be provided and generated satisfying all constraints and preferences of the group members while balancing over the selected time period the degree of satisfaction of all group members.

Also, it should be noted as described herein, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. As such, the present invention seeks to improve a user's experience and satisfaction by receiving one or more meal recommendations using one or more IoT devices in an IoT network.

Additional aspects of the present invention and attendant benefits will be further described, following.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Recollection from relevant data points (images, text, voice) (memorization and recall); and/or 13) Predict and sense with situational awareness operations that mimic human cognition based on experiences.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
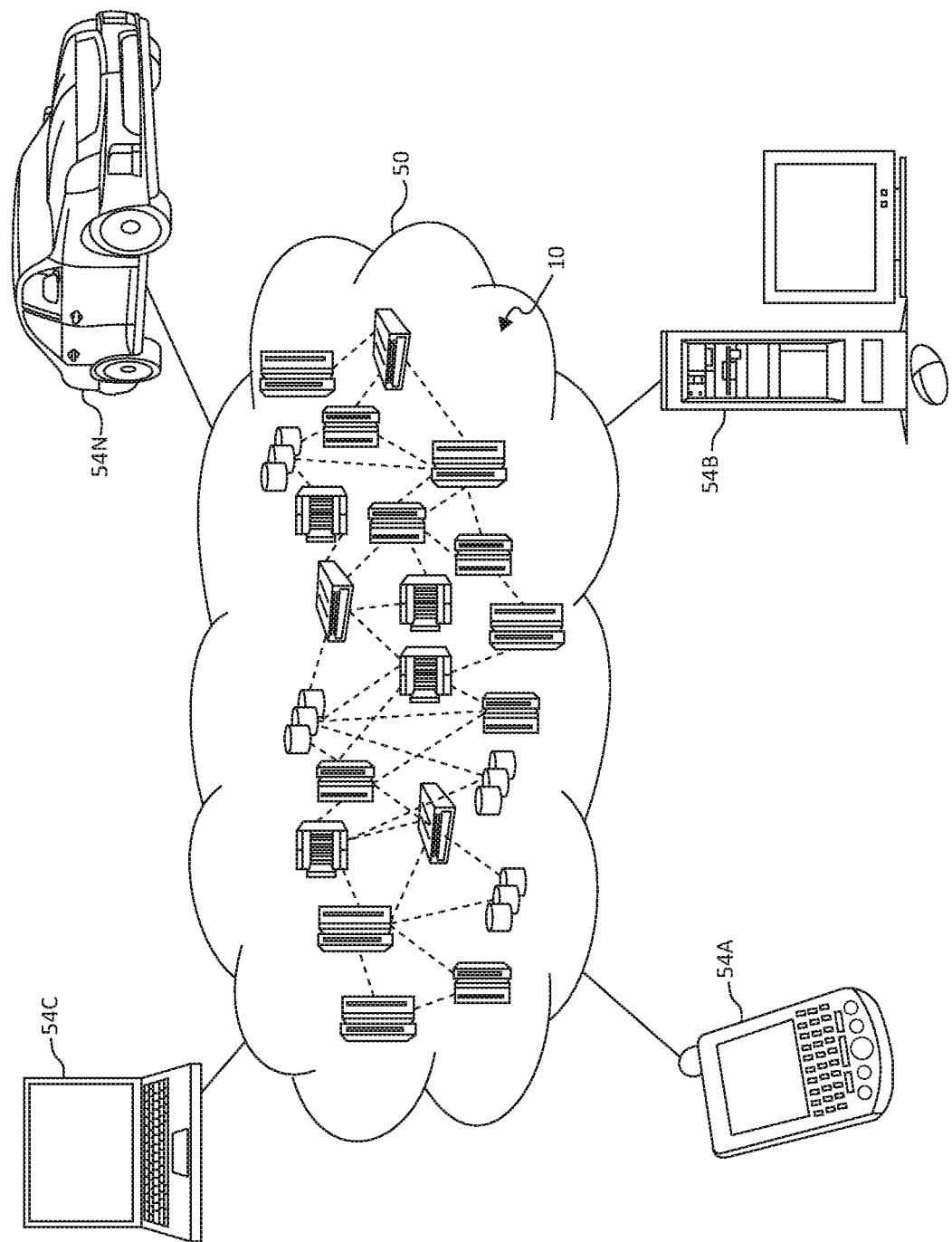
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
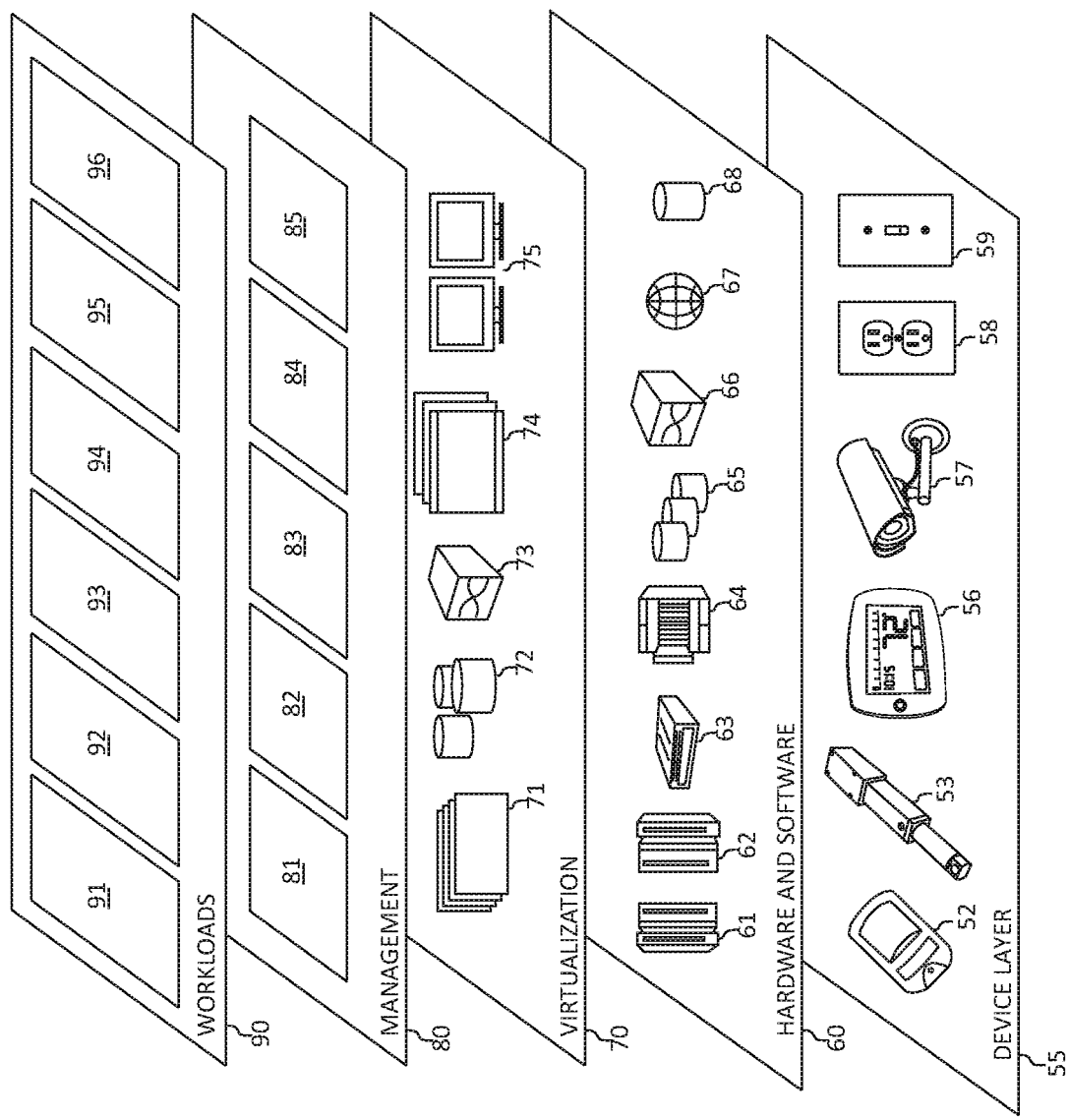
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various meal recommendation workloads and functions 96. In addition, meal recommendation workloads and functions 96 may include such operations as data analysis (including data collection and processing from various environmental sensors), collaborative data analysis, and predictive data analytics functions. One of ordinary skill in the art will appreciate that the meal recommendation workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
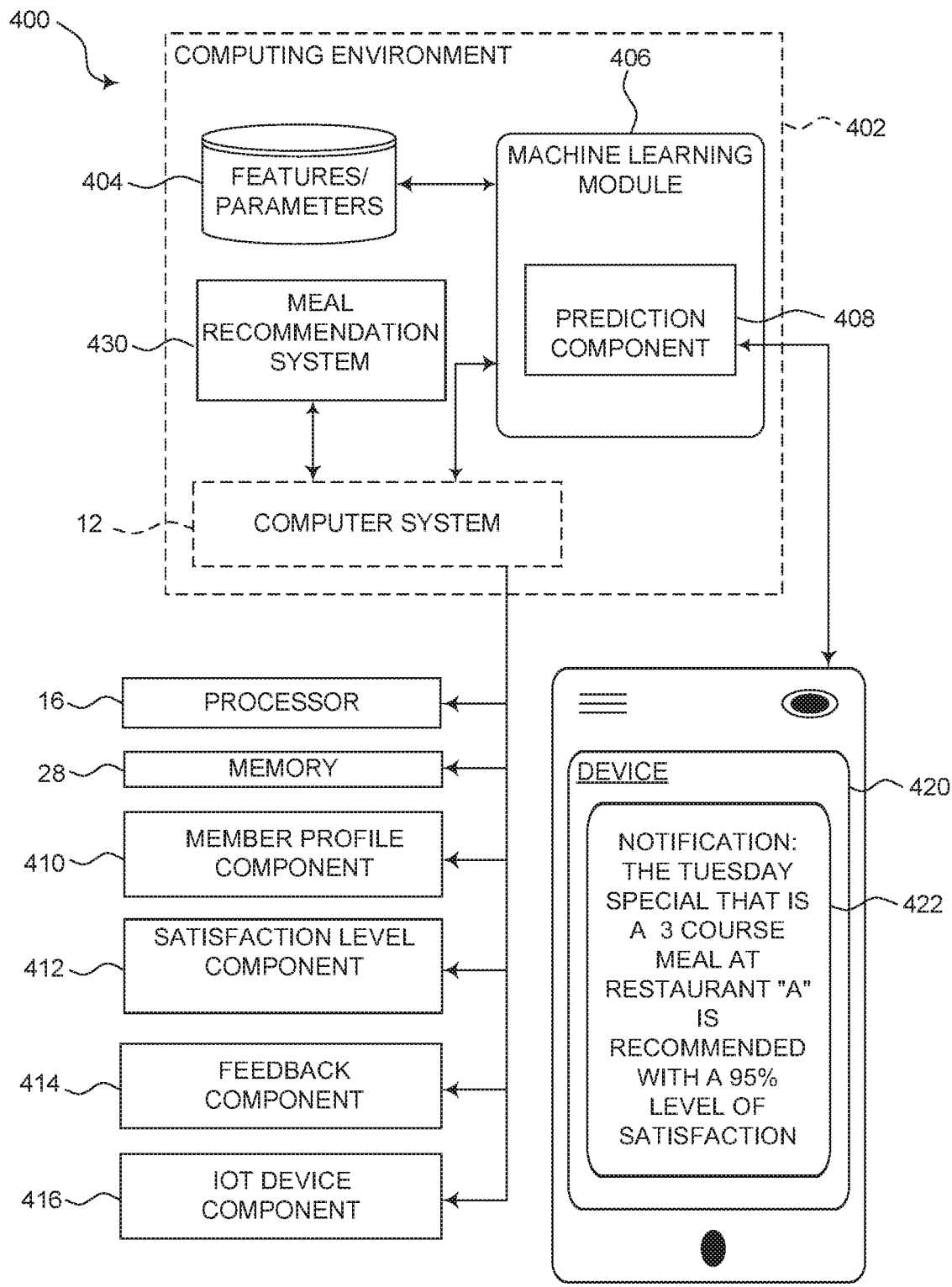
FIG. 4 is a diagram depicting various user hardware and computing components functioning in accordance with aspects of the present invention.

Turning now to FIG. 4, a block diagram depicting exemplary functional components 400 according to various mechanisms of the illustrated embodiments is shown. FIG. 4 illustrates meal recommendation workloads and functions and training of a machine-learning model in a computing environment, such as a computing environment 402, according to an example of the present technology. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for meal recommendation in accordance with the present invention. Many of the functional blocks 400 may execute as background processes on various components, either in distributed computing components, or on the user device, or elsewhere. Computer system/server 12 is again shown, incorporating processing unit 16 and memory 28 to perform various computational, data processing and other functionality in accordance with various aspects of the present invention.

The system 400 may include the computing environment 402, a meal recommendation system 430, and a device 420, such as a desktop computer, laptop computer, tablet, smart phone, and/or another electronic device that may have one or more processors and memory. The device 420, the meal recommendation system 430, and the computing environment 402 may each be associated with and/or in communication with each other, by one or more communication methods, such as a computing network. In one example, the device 420 and/or the meal recommendation system 430 may be controlled by an owner, customer, or technician/administrator associated with the computing environment 402. In another example, the device 420 and/or the meal recommendation system 430 may be completely independent from the owner, customer, or user of the computing environment 402.

In one aspect, the computing environment 402 may provide virtualized computing services (i.e., virtualized computing, virtualized storage, virtualized networking, etc.) to device 420. More specifically, the computing environment 402 may provide virtualized computing, virtualized storage, virtualized networking and other virtualized services that are executing on a hardware substrate.

As depicted in FIG. 4, the computing environment 402 may include a machine learning module 406, a features and/or parameters 404 that is associated with a machine learning module 406, and the meal recommendation system 430. The features and/or parameters database 404 may also include member profiles for each meal recommendation system 430 and/or IoT sensor devices associated with a IoT device component 416. It should be noted that one or more IoT sensor devices may be represented as the IoT device component 416 may be coupled to the meal recommendation system 430. The features and/or parameters 404 may be a combination of features, parameters, behavior characteristics, member/user profile data, eating preference data, health and nutrition data, nutritional constraint data, health constraint data, meal type data, available meal data (e.g., from a food source), historical data, tested and validated data, or other specified/defined data for testing, monitoring, validating, detecting, learning, analyzing and/or calculating various conditions or diagnostics relating to cognitively recommending one or more meals in the meal recommendation system 430. That is, different combinations of parameters may be selected and applied to the input data for learning or training one or more machine learning models of the machine learning module 406. The features and/or parameters 404 may define one or more settings of an IoT device (e.g., IoT device 420) associated with the IoT device component 416 to enable the IoT device 420 to interact with a member or user of the IoT device 420 and the computer system 12. The IoT device component 416 may be associated with the meal recommendation system 430 and the IoT device 420.

The computing environment 402 may also include a computer system 12, as depicted in FIG. 1. The computer system 12 may also include a member profile component 410, a satisfaction level component 412, a feedback component 414, and the IoT device component 416 each associated with the machine learning module for training and learning one or more machine learning models and also for applying multiple combinations of features, parameters, behavior characteristics, member/user profile data, eating preference data, health and nutrition data, nutritional constraint data, health constraint data, meal type data, available meal data (e.g., from a food source), historical data, or a combination thereof to the machine learning model for cognitively recommending one or more meals in a meal recommendation system 430.

In one aspect, the machine learning module 406 may include a prediction component 408 for cognitively recommending one or more meals and food sources, and/or learning a behavior from a plurality of factors of a member profile for each member in a group of members, by one or more IoT devices 420 associated with the IoT device component 416 in the meal recommendation system 430.

The member profile component 410 may include data relating to a satisfaction level for a variety of meals, food types, food sources, or a combination thereof each of which may include a plurality of factors. The plurality of factors may include a plurality of eating preferences, eating preference locations, nutritional constraints, one or more health constraints, one or more meal types, one or more available meals, favorite food choices, dislikes, cooking skills of each member, preparation time, time constraints of each member (e.g., calendars and appointments), recipe database, or a combination thereof. Each of the plurality of factors may be assigned a numerical value, a percentage, or a weighted value. The plurality of factors may be ranked and organized by priority (e.g., highest numerical value indicates a stronger preference or like while lower numerical values indicate a dislike or disapproval, or vice versa).

The computer system 12 may use a satisfaction level component 412 to cognitively determine a level of satisfaction for one or more previously ordered/consumed meals (or even a currently ordered, requested, or consumed meal). The satisfaction level component 412 may use the member profile component 410 to collect, gather, calculate, and cognitively determine a level of satisfaction. Also, the satisfaction level component 412 may use the one or more IoT device components 416 to cognitively determine a level of satisfaction such as, for example, by collecting biometric data, hand (a "thumbs-up" hand gesture) or face gestures (e.g., a smile or frown), or one or more communication messages to a social media network (e.g., the member shares a picture of a meal with a "like" and comment stating "I love eating at Restaurant A and having the Tuesday night special").

A feedback component 414 may use a variety of feedback information relating to the meal recommendation system 430. The level of satisfaction, feedback information, and/or user profile may be defined, stored, and maintained in the feedback component 414 and used by the machine learning module 406, the features and/or parameters 404, or both. The feedback component 414 may collect a variety of feedback information for each member in the group of members. For example, the feedback component 414 may collect each communication of the device 420 for each member relating to a historical or current meal recommendation, a vote or suggestion made by a member relating to the historical or current meal recommendation, and even feedback information relating to reviews, comments, or data relating to the historical or current meal recommendation and one or more food sources.

Additionally, the machine learning module 406, in conjunction with the prediction component 408, may use the feedback information to provide a cognitive estimation of satisfaction level for each member of the group of members of the meal recommendation system 430. Moreover, the machine learning module 406 may use the feedback information to cognitively balance (over a selected period of time) the satisfaction level based on the member profile data of the member profile component 410. That is, the machine learning module 406 takes into consideration each member's individual energy profile with the plurality of factors to recommend one or more meals or food sources to the group of members that achieves a greater percentage (e.g., over 50%) or higher probability of satisfaction for all the members of the group. In short, the machine learning module 406 may be initialized using feedback information to learn behavior and preferences of each group member for cognitively recommending one or more meals, food sources, or a combination thereof in meal recommendation system 430.

Also, the device 420 may include a graphical user interface (GUI) 422 enabled to display on the device 420 one or more user interface controls for a user to interact with the GUI 422. For example, the GUI 422 may display a recommended meal, meal courses, food sources, or a combination thereof to a user via an interactive graphical user interface (GUI). For example, the recommended meal, meal courses, food sources, or a combination thereof may indicate or display audibly and/or visually on the GUI 422 "Notification: The Tuesday special that is a 3 course meal at restaurant "A" is recommended with a 95% level of satisfaction."

In one aspect, cognitive recommendation of a meal, meal courses, food sources, or a combination thereof and estimation/predictive modeling (or machine learning modeling), as described herein, may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

Figure 5:
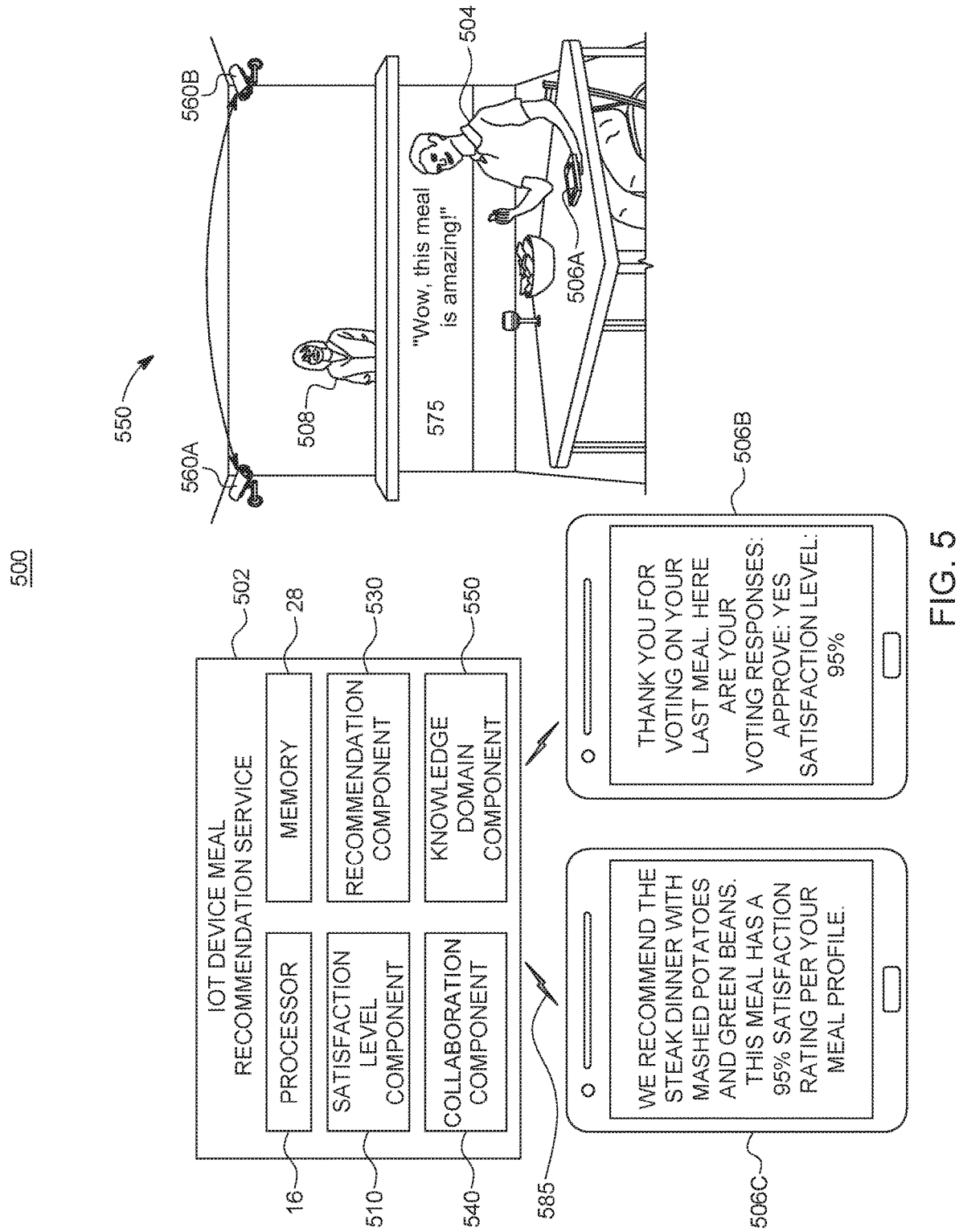
FIG. 5 is a flowchart diagram depicting an exemplary method for recommending meals for a group of members using a plurality of types of IoT devices in an IoT network environment in which aspects of the present invention may be implemented.

Turning now to FIG. 5, a block diagram depicting exemplary functional components 500 according to various mechanisms of the illustrated embodiments is shown. As shown, the various functionality, or "modules" or "components" of functionality, hardware devices, and/or other components in the same descriptive sense as has been previously described in FIGS. 1-4 may be included in FIG. 5. For example, processing unit 16 and memory 28 of FIG. 1 may be employed in FIG. 5 to perform various computational, data processing, storage and other functionality in accordance with various aspects of the present invention.

The functional components 500 may include the meal recommendation service 502 (or an "IoT device meal recommendation service 502"), having a satisfaction level component 510, a recommendation component 530, a collaboration component 540, and a knowledge domain component 550. (e.g., a knowledge database), each of which may work in communication with each other. In one aspect, computer device 12 of FIG. 1 may include the meal recommendation service 502. The meal recommendation service 502 may communicate with one or more IoT devices such as, for example IoT device 506A-C, via a communication network 585 (e.g., a wireless communication network/system).

The meal recommendation service 502 may be in communication with one or more IoT devices, such as cameras 560A, 560B or even one or more computer devices, such as, for example, computer devices 506A-C (which may have a camera device embedded or associated with a computing device such as, for example, a personal computer, laptop, smart phone, tablet, watch, and the like) via one or more communication networks as described herein. The meal recommendation service 502 may gather and collect collaborative data from each of the one or more IoT devices, such as communication messages (assuming authorization and security protocols have been approved, allowed, or provided), audio, images or videos from cameras 560A, 560B and/or one or more computer devices, such as, for example, computer devices 506A-C, in a plurality of mixed types of IoT devices in an IoT network to derive a holistic view of member/user satisfaction. For example, the cameras 560A, 560B may be located in a food source 575, such as a restaurant with one or more cooks 508. The cameras 560A, 560B may be in communication with the IoT device meal recommendation service 502 and the one or more computer devices, such as, for example, computer devices 506A-C.

The satisfaction level component 510 may use the collaboration of data (e.g., historical and real-time data) gathered from one or more collaborative members in a group of members (e.g., a household, a family, a business, a group of friends, a political group, a social network, organization, governmental entity, a group that includes members of other groups, and the like) to determine a level of satisfaction of the user according to an ontology in the knowledge domain component 550 (which may define, store, and maintain a member profile for each user/member) describing a plurality of satisfaction factors and levels (which may be assigned a value, rank, percentage, or other numerical means for comparing, ranking, or calculating a satisfaction level or "degree of satisfaction") of one or more meals, food types, eating preferences, eating preference locations, nutritional data, nutritional constraints, health and dietary data, medical data, allergy data, one or more health constraints, one or more available meals, favorite food choices or food sources, dislike (e.g., dislikes or unfavorable types of one or more types of meals, food choices, or food sources), or a combination thereof, such that the collaboration of data is associated with one or more of the plurality of satisfaction factors and levels.

The satisfaction level component 510 may apply one or more machine learning models to associate the plurality of satisfaction factors and levels with the level of satisfaction using feedback of each member of a group of users, a member profile of each member, environmental data, physical gestures of the customer, an emotion of the customer, speech of the customer, facial gestures, facial expressions, biological data, voice inflections and tones, an interaction detected between the customer and a service, product, or person, or a combination thereof collected from the one or more of the plurality of types of IoT devices (e.g., IoT devices 560A, 560B, and/or 506A-C).

The satisfaction level component 510 may also compare data and a plurality of factors that have been ranked, sorted, or assigned a numerical value or definition indicating approval, disapproval, neutrality, or other sliding scale for reflecting a degree of satisfaction. The comparison may be used to calculate a satisfaction level of each member in the group of members and even calculating a satisfaction level for the entire group of members for the cognitive recommendation of a meal, meal courses, food sources, or a combination thereof.

For example, the satisfaction level component 510 collects the collaborative data and determines, using the knowledge domain component 550, a relationship between the member profile, physical stimuli, a physical, biological, and/or emotional reaction of a user, such as an interaction between a customer and a meal or food source, a perception of the stimuli by an observer, or a combination thereof. Psychophysical measurements may be used to monitor and determine the user's (e.g., customer) response to stimuli.

The satisfaction level component 510 analyzes the collaboration of data to determine one or more of the plurality of satisfaction factors and levels. That is, satisfaction level component 510 may perform an analysis on each of the factors or stimuli that result in an increase and/or decrease to a user's satisfaction level.

For example, the satisfaction level component 510 may determine, from the collaborative data, that a customer 504 has a positive level or high level of customer satisfaction of a previously ordered or consumed meal(s) (e.g., level of customer satisfaction determined to be a rating of 95% out of 100% with 100% being a highest rated or range of positive satisfaction and 0% being the lowest satisfaction or negative satisfaction) as compared to other previously determined levels of customer satisfaction relating to the member profile. That is, the meal or food source having the highest rated positive customer level may be determined according to the collaborative data of the customer 504 eating a meal at a selected food source (e.g., restaurant) such as, for example, by detecting a facial expression with a smile, wide eyes, a hand gesture as a form of a common "thumbs-up", and an exclamation in a loud, audible tone "Wow, this meal is amazing."

In an additional example, such as in a restaurant setting 575 or other environment (e.g., cafeteria, home, office, hotel, or other location), the satisfaction level component 510 may determine, from the collaborative data, that a customer's face turns a reddish color, observe multiple hand gestures, detect an increase in volume of speech, detect an enlargement of the eyes when a waiter 508 at the restaurant 575 delivers late, cold food, which may also be the wrong order. The satisfaction level may be identified as extremely low and may be assigned or calculated a value (e.g., a percentage of 10% favorable rating or weighted value showing 1 out of scale of 10 where "1" is the lowest possible rating) that the late, cold food is the wrong food and the stimuli that produces animated hand gestures, a reddish facial color, increased volume level in the customer's speech, enlarged eyes, or even a frown on the face as compared to having a smile.

In response, one or more machine learning models may be used to associate the plurality of satisfaction factors and levels with the level of satisfaction using the collaborative data, which may include, for example, psychophysical data, meal data, historical data, nutritional data, meal preferences and constraints, environmental data, physical gestures of the customer, an emotion of the customer, a speech of the customer, an interaction detected between the customer and a service, product, or person, or a combination thereof collected from the one or more of the plurality of types of IoT devices, such as cameras 560A and 560B. The collected data may be used to collaborate all data using the collaboration component 540 and each machine learning component to learn and understand various emotions, states, audible data, physiological movements and gestures, and/or biological data of a user. Once a machine learning model is calibrated and tuned according to the collaboration component 540, the emotional state, mood, stress level, facial expression, speech patterns, voice tone, and/or body language, such as an angry or happy customer, expressionless entities, etc. may be used and applied for determining a satisfaction level of each member.

In an additional aspect, the collaboration component 540 may also be used to receive one or more communications, messages, reviews, or input/output data from each member of the group of members. More specifically, the collaboration component 540 may request a member to provide a review of "vote" as to the satisfaction level of one or more meals, meal courses, food sources, or a combination thereof. For example, as depicted in IoT device 506B (e.g., a smart phone of a member of a group of members), a user may vote and a message may be displayed on the IoT device 506B stating "Thank you for voting on your last meal. Here are your voting responses: Approve: Yes, Satisfaction Level: 95%".

The recommendation component 530 may provide one or more solutions, suggestions, or recommendations for one or more meals, meal courses, food sources, or a combination thereof. The recommendation component 530 may provide the one or more solutions, suggestions, or recommendations via the knowledge domain component 550 and/or the satisfaction level component 510 thereby linking one or more of the plurality of satisfaction factors and levels to the collaboration of data of the collaboration component 540. The recommendation component 530 may include both an assigned satisfaction level for each individual user and also a satisfaction level for the entire group that has been balanced and determined over a selected period of time.

The detection of the level of satisfaction (e.g., a level of a customer's mood) may be applied and used for a meal type or recipe, such as, for example, spicy, sweet, sour, type of cuisine (e.g., Italian food or Chinese food) and the like. The level of satisfaction (e.g., a detection of a user's mood) may be associated with using a semantic analysis, as well as cluster based pattern matching operation, to identify an actual cause leading to a current satisfaction level or a dissatisfaction level.

In one aspect, the recommendation component 530 may communicate a solution to a graphical user interface (GUI) of a computing device or mobile device such as, for example IoT devices 506B and C. For example, the recommendation component 530 may communicate, via a wireless communication system 585, a recommendation to a display screen of a computer or mobile device of the IoT device 506C (or even 506A and 506B) indicating a recommendation for one or more meals, meal courses, food sources, or a combination thereof stating "We recommend the steak dinner with mashed potatoes and green beans. This meal has a 95% satisfaction rating per your meal profile."

In an additional example, the recommendation component 530 may communicate a recommendation of group member messages, voting results, or likes/dislikes to a graphical user interface (GUI) of each member's computing device or mobile device. For example, upon detecting a satisfaction level, a first member or a second member may immediately receive a notification or alert indicating the satisfaction level for the one or more meals, meal courses, food sources, or a combination thereof. For example, member "A", using IoT device 506C and/or 506B, has a satisfaction level of 95% for the steak dinner, mashed potatoes, and green beans and member "B" has voted the last meal ordered/consumed as "approved" and a satisfaction level has been calculated, assigned, or determined as 95%. That is, the recommendation component 530 may communicate both the recommendations, satisfaction levels, voting results, or other communications or messages relating to one or more meals, meal courses, food sources, or a combination thereof. It should be noted that the examples as used herein are provided for illustrative purposes and should not be construed as limiting, and the embodiments described herein may apply to one or more food type industries.

In one aspect, the knowledge domain may be an ontology of concepts representing a domain of knowledge. For example, the knowledge domain component 550 may parse through a knowledge domain having an ontology of psychophysical responses, communications, semantics, and behaviors according to one or more stimuli, features, parameters, behavior characteristics, member/user profile data, eating preference data, health and nutrition data, nutritional constraint data, health constraint data, meal type data, available meal data (e.g., from a food source), historical data, environmental data, physical gestures of the customer, various types of emotions and stimuli that produces the emotions, speech patterns, facial gestures, facial expressions, biological data, voice inflections and tones, an interaction detected between the customer and a service, product, or person, emotional state, mood, stress level, and/or body language, or a combination thereof to assist the IoT devices in improving the customer experience and satisfaction in a food based industry using the mixed types of IoT devices in the IoT network so as to recommend one or more meals, meal courses, food sources, or a combination thereof.

A thesaurus or ontology may be used as the domain knowledge of the knowledge domain component 550 and may also be used to identify semantic relationships between observed and/or unobserved variables. In one aspect, the term "domain" is a term intended to have its ordinary meaning. In addition, the term "domain" may include an area of expertise for a system or a collection of material, information, content and/or other resources related to a particular subject or subjects. For example, a domain can refer to physical phenomena, features, parameters, behavior characteristics, member/user profile data, eating preference data, health and nutrition data, nutritional constraint data, health constraint data, meal type data, available meal data (e.g., from a food source), historical data, biological, physiological, environmental, scientific, industrial, educational, statistical data, medical, commercial, health, manufacturer information, biomedical-specific information, one or more stimuli and response types in a variety of applications, physical gestures of the customer, various types of emotions and stimuli that produce the various emotions, speech patterns, facial gestures, facial expressions, biological data, voice inflections and tones, or an interaction detected between the customer and a service, product, or person. A domain can refer to information related to any particular subject matter or a combination of selected subjects.

In one aspect, one or more improvements to the level of satisfaction may be increased or decreased (based on defined preferences in a user profile) for a customer for each repeat of one or more meals, meal courses, food sources, or a combination thereof. The same findings may be stored in a database so that when the same customer eats a particular meal(s) or visits (determined by a face recognition algorithm) a particular food source, the machine learning model can use all previous interpretations, analysis, and/or determinations at other locations for recommending one or more meals, meal courses, food sources, or a combination thereof.

The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

Figure 6:
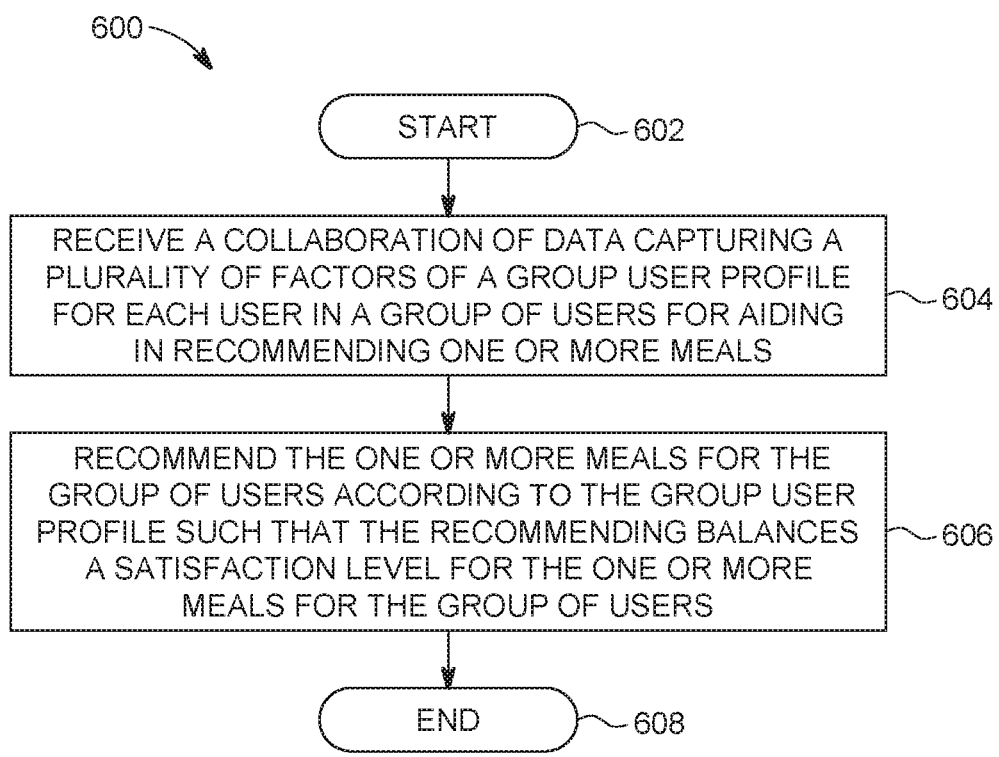
FIG. 6 is a flowchart diagram of an exemplary method for recommending meals for a group of members by a processor, in which various aspects of the present invention may be realized.

Turning now to FIG. 6, a method 600 for recommending meals for a group of members by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602. A collaboration of data capturing a plurality of factors of a group user profile for each user in a group of users may be received for aiding in recommending one or more meals, as in block 604. The one or more meals (which may be a single course meal or multiple course meal having a main dish, side dishes, and/or dessert, and the like) may be recommended for the group of users according to the group user profile such that the recommending balances a satisfaction level for the one or more meals for the group of users, as in block 606. The functionality 600 may end, as in block 608.

Figure 7:
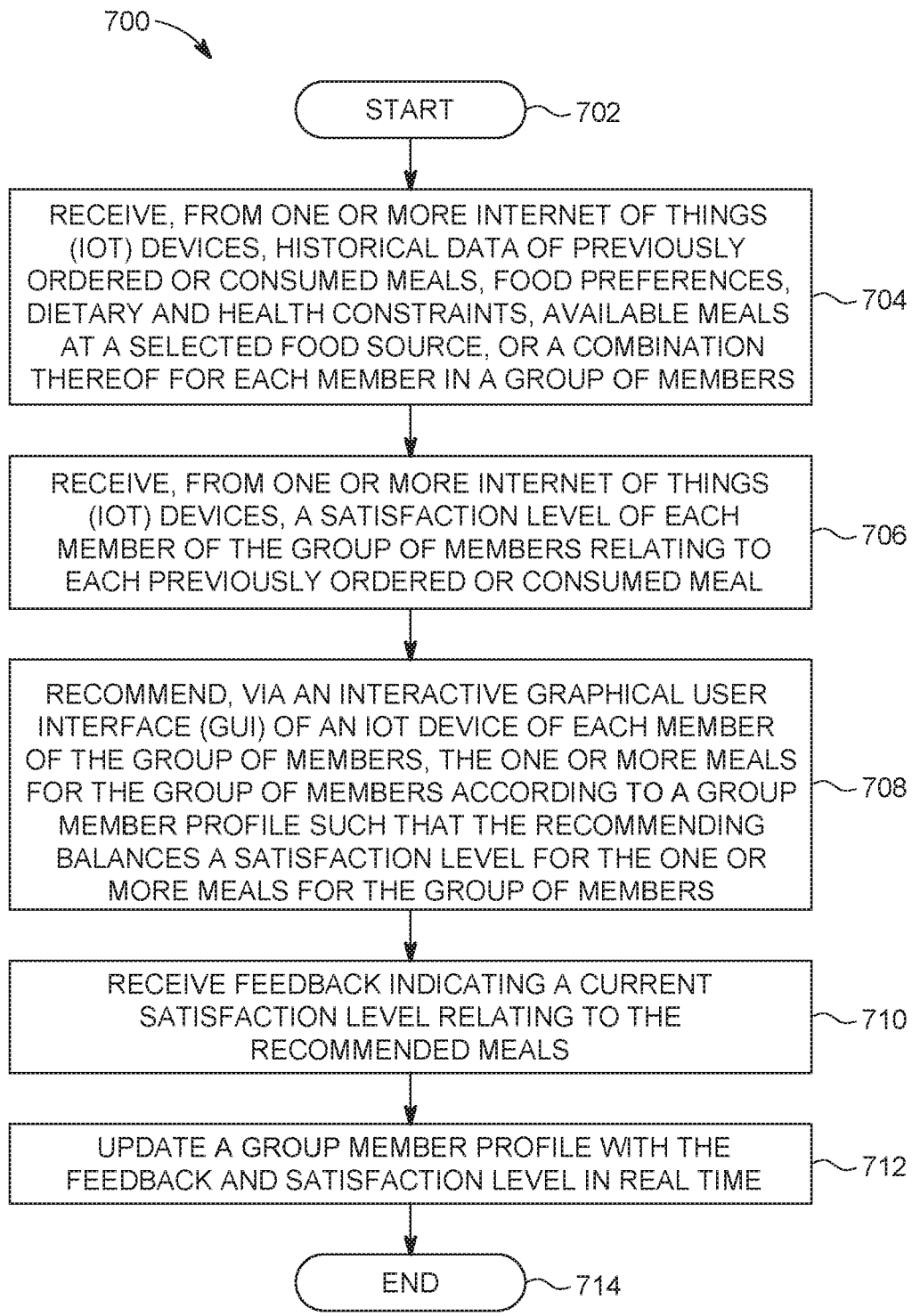
FIG. 7 is a flowchart diagram of an additional exemplary method for recommending meals for a group of members using a plurality of types of IoT devices in an IoT network environment by a processor, in which various aspects of the present invention may be realized.

Turning now to FIG. 7, a method 700 for recommending meals for a group of members using a plurality of types of IoT devices in an IoT network environment is depicted, in which various aspects of the illustrated embodiments may be implemented. That is, FIG. 7 is a flowchart of an additional example method 700 for recommending meals for a group of members/users in a computing environment according to an example of the present invention. The functionality 700 may start in block 702. Historical data of previously ordered or consumed meals, food preferences, dietary and health constraints, available meals at a selected food source, or a combination thereof may be received, from one or more IoT devices, for each member in a group of members, as in block 704. A satisfaction level of each member of the group relating to each previously ordered or consumed meal may be received, from one or more IoT devices, as in block 706. One or more meals for the group of users may be recommended, via an interactive graphical user interface (GUI) of an IoT device of each member of the group of members, according to the group user profile such that the recommending balances a satisfaction level for the one or more meals for the group of users, as in block 708. Feedback indicating a current satisfaction level relating to the recommended one or more meals may be received, as in block 710. A member profile of one or more of the group of users may be updated in real time with the feedback and satisfaction level, as in block 712. The functionality 700 may end, as in block 714.

In one aspect, in conjunction with and/or as part of at least one block of FIGS. 6 and 7, the operations of methods 600 and 700 may include each of the following. The operations of methods 600 and 700 may include determining the satisfaction level for each of the one or more meals that are recommended according to each group user profile, determining the satisfaction level for each of the one or more previously requested meals by comparing the group user profile for each user to each of the one or more previously requested meals, and defining the satisfaction level according to the plurality of factors, wherein the plurality of factors include a plurality of eating preferences, nutritional constraints, one or more health constraints, one or more meal types, one or more available meals, or a combination thereof and each of the plurality of factors are weighted values.

The operations of methods 600 and 700 may collect feedback information from the group of users for determining the satisfaction level for each of the one or more previously requested meals or the one or more meals that are recommended, and initialize a machine learning mechanism using the feedback information to learn the group user profile and behavior for each of the users, recommend the one or more meals, determine the satisfaction level, or a combination thereof.

The operations of methods 600 and 700 may display in real time, via an interactive graphical user interface (GUI), the collaboration of data, the one or more meals recommended for the group of users, the satisfaction level, or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for recommending meals in a computing environment, comprising:
   receiving a collaboration of data capturing a plurality of factors of a group user profile for each user in a group of users for aiding in recommending one or more meals, wherein the plurality of factors are implicitly derived from automated analyses of historical data of one or more meals consumed by each user in the group of users, the plurality of factors including nutritional constraints, one or more meal types, time constraints of each user, and a preparation time to prepare the one or more meals consumed by each user;
   determining a level of satisfaction according to real-time physiological data monitored by sensory devices associated with each user and the historical data associated with the one or more meals consumed by each user in the group of users, wherein the level of satisfaction is identified, at least in part, according to reviews and one or more communication messages posted to a social media network by respective users of the group of users, wherein determining the level of satisfaction includes correlating types of cuisine and characteristics of recipes used in the types of cuisine to a psychological disposition of the respective users according to a semantic analysis performed on at least a portion of the physiological data, and wherein the correlation identifies a root cause of the determined level of satisfaction for the respective users with respect to the characteristics of recipes used in the types of cuisine;
   training a machine learning model utilizing the collaboration of data, wherein training the machine learning model includes training a classifier to correlate the real-time physiological data and the historical data with the level of satisfaction associated with the one or more meals consumed by each user in the group of users; and
   responsive to an analysis of the machine learning model, recommending the one or more meals for the group of users according to the group user profile such that the recommending balances the satisfaction level for the one or more meals recommended for the group of users.

2. The method of claim 1, further including determining the satisfaction level for each of the one or more meals that are recommended according to each group user profile.

3. The method of claim 1, further including determining the satisfaction level for each of the one or more previously requested meals by comparing the group user profile for each user to each of the one or more previously requested meals.

4. The method of claim 1, further including defining the satisfaction level according to the plurality of factors, wherein the plurality of factors further include a plurality of eating preferences, one or more health constraints, one or more meal types, cooking skills of each user, or a combination thereof and each of the plurality of factors are weighted values.

5. The method of claim 1, further including collecting feedback information from the group of users for determining the satisfaction level for each of the one or more previously requested meals or the one or more meals that are recommended.

6. The method of claim 5, further including initializing a machine learning mechanism using the feedback information to learn the group user profile and behavior for each of the users, recommending the one or more meals, determining the satisfaction level, or a combination thereof.

7. The method of claim 1, further including displaying in real time, via an interactive graphical user interface (GUI), the collaboration of data, the one or more meals recommended for the group of users, the satisfaction level, or a combination thereof.

8. A system for recommending meals, comprising:
one or more computers with executable instructions that when executed cause the system to:
receive a collaboration of data capturing a plurality of factors of a group user profile for each user in a group of users for aiding in recommending one or more meals, wherein the plurality of factors are implicitly derived from automated analyses of historical data of one or more meals consumed by each user in the group of users, the plurality of factors including nutritional constraints, one or more meal types, time constraints of each user, and a preparation time to prepare the one or more meals consumed by each user;
determine a level of satisfaction according to real-time physiological data monitored by sensory devices associated with each user and the historical data associated with the one or more meals consumed by each user in the group of users, wherein the level of satisfaction is identified, at least in part, according to reviews and one or more communication messages posted to a social media network by respective users of the group of users, wherein determining the level of satisfaction includes correlating types of cuisine and characteristics of recipes used in the types of cuisine to a psychological disposition of the respective users according to a semantic analysis performed on at least a portion of the physiological data, and wherein the correlation identifies a root cause of the determined level of satisfaction for the respective users with respect to the characteristics of recipes used in the types of cuisine;
train a machine learning model utilizing the collaboration of data, wherein training the machine learning model includes training a classifier to correlate the historical data with the level of satisfaction associated with the one or more meals consumed by each user in the group of users; and
responsive to an analysis of the machine learning model, recommend the one or more meals for the group of users according to the group user profile such that the recommending balances the satisfaction level for the one or more meals recommended for the group of users.

9. The system of claim 8, wherein the executable instructions determine the satisfaction level for each of the one or more meals that are recommended according to each group user profile.

10. The system of claim 8, wherein the executable instructions determine the satisfaction level for each of the one or more previously requested meals by comparing the group user profile for each user to each of the one or more previously requested meals.

11. The system of claim 8, wherein the executable instructions define the satisfaction level according to the plurality of factors, wherein the plurality of factors further include a plurality of eating preferences, one or more health constraints, one or more meal types, cooking skills of each user, or a combination thereof and each of the plurality of factors are weighted values.

12. The system of claim 8, wherein the executable instructions collect feedback information from the group of users for determining the satisfaction level for each of the one or more previously requested meals or the one or more meals that are recommended.

13. The system of claim 12, wherein the executable instructions initialize a machine learning mechanism using the feedback information to learn the group user profile and behavior for each of the users, recommend the one or more meals, determine the satisfaction level, or a combination thereof.

14. The system of claim 8, wherein the executable instructions display in real time, via an interactive graphical user interface (GUI), the collaboration of data, the one or more meals recommended for the group of users, the satisfaction level, or a combination thereof.

15. A computer program product for recommending meals by a processor, the computer program product comprising a non-transitory computer-readable storage medium having computer-readable program code portions stored therein, the computer-readable program code portions comprising:
an executable portion that receives a collaboration of data capturing a plurality of factors of a group user profile for each user in a group of users for aiding in recommending one or more meals, wherein the plurality of factors are implicitly derived from automated analyses of historical data of one or more meals consumed by each user in the group of users, the plurality of factors including nutritional constraints, one or more meal types, time constraints of each user, and a preparation time to prepare the one or more meals consumed by each user;
an executable portion that determines a level of satisfaction according to real-time physiological data monitored by sensory devices associated with each user and the historical data associated with the one or more meals consumed by each user in the group of users, wherein the level of satisfaction is identified, at least in part, according to reviews and one or more communication messages posted to a social media network by respective users of the group of users, wherein determining the level of satisfaction includes correlating types of cuisine and characteristics of recipes used in the types of cuisine to a psychological disposition of the respective users according to a semantic analysis performed on at least a portion of the physiological data, and wherein the correlation identifies a root cause of the determined level of satisfaction for the respective users with respect to the characteristics of recipes used in the types of cuisine;

an executable portion that trains a machine learning model utilizing the collaboration of data, wherein training the machine learning model includes training a classifier to correlate the historical data with the level of satisfaction associated with the one or more meals consumed by each user in the group of users; and an executable portion that, responsive to an analysis of the machine learning model, recommends the one or more meals for the group of users according to the group user profile such that the recommending balances the satisfaction level for the one or more meals recommended for the group of users.

16. The computer program product of claim 15, further including an executable portion that determines the satisfaction level for each of the one or more meals that are recommended according to each group user profile.

17. The computer program product of claim 15, further including an executable portion that determines the satisfaction level for each of the one or more previously requested meals by comparing the group user profile for each user to each of the one or more previously requested meals.

18. The computer program product of claim 15, further including an executable portion that defines the satisfaction level according to the plurality of factors, wherein the plurality of factors further include a plurality of eating preferences, one or more health constraints, one or more meal types, cooking skills of each user, or a combination thereof and each of the plurality of factors are weighted values.

19. The computer program product of claim 15, further including an executable portion that:

collects feedback information from the group of users for determining the satisfaction level for each of the one or more previously requested meals or the one or more meals that are recommended; and initializes a machine learning mechanism using the feedback information to learn the group user profile and behavior for each of the users, recommends the one or more meals, determines the satisfaction level, or a combination thereof.

20. The computer program product of claim 15, further including an executable portion that displays in real time, via an interactive graphical user interface (GUI), the collaboration of data, the one or more meals recommended for the group of users, the satisfaction level, or a combination thereof.

* * * * *